(12) United States Patent
Rice et al.

(10) Patent No.: US 7,203,752 B2
(45) Date of Patent: Apr. 10, 2007

(54) METHOD AND SYSTEM FOR MANAGING LOCATION INFORMATION FOR WIRELESS COMMUNICATIONS DEVICES

(75) Inventors: Christopher R. Rice, Broomfield, CO (US); Cameron Fieber, Victoria (CA); Ron Poulin, Victoria (CA); Peter Jones, Richmond Surrey (GB)

(73) Assignee: Openwave Systems Inc., Redwood City, CA (US)

( * ) Notice: Subject to any disclaimer, the term of this patent is extended or adjusted under 35 U.S.C. 154(b) by 680 days.

(21) Appl. No.: 10/076,682

(22) Filed: Feb. 14, 2002

(65) Prior Publication Data

US 2003/0023726 A1 Jan. 30, 2003

Related U.S. Application Data

(60) Provisional application No. 60/269,506, filed on Feb. 16, 2001.

(51) Int. Cl.
*G06F 15/173* (2006.01)

(52) U.S. Cl. .................. 709/225; 709/227; 709/217; 379/201.01; 379/201.02

(58) Field of Classification Search ................ 709/220, 709/222, 201, 203, 207, 225, 240, 246, 227, 709/217; 701/200, 213; 73/178 R; 705/1, 705/13, 18, 21; 706/45; 707/1, 9, 10; 710/105; 713/150, 161, 200; 379/201.01, 201.02
See application file for complete search history.

(56) References Cited

U.S. PATENT DOCUMENTS

| | | | | |
|---|---|---|---|---|
| 5,629,693 A | * | 5/1997 | Janky | 340/988 |
| 6,081,600 A | | 6/2000 | Blanchard et al. | 380/255 |
| 6,085,083 A | | 7/2000 | Lamb | 455/410 |
| 6,104,931 A | * | 8/2000 | Havinis et al. | 455/456.5 |
| 6,115,754 A | * | 9/2000 | Landgren | 709/236 |
| 6,163,701 A | | 12/2000 | Saleh et al. | 455/456.2 |
| 6,226,511 B1 | | 5/2001 | Jacobs et al. | 455/411 |
| 6,311,069 B1 | | 10/2001 | Havinis et al. | 455/456.4 |
| 6,321,092 B1 | | 11/2001 | Fitch et al. | 455/456.5 |
| 6,334,056 B1 | * | 12/2001 | Holmes et al. | 455/445 |
| 6,377,810 B1 | | 4/2002 | Geiger et al. | 455/456.2 |
| 6,463,289 B1 | * | 10/2002 | Havinis et al. | 455/456.4 |
| 6,615,276 B1 | * | 9/2003 | Mastrianni et al. | 709/220 |
| 6,721,633 B2 | * | 4/2004 | Funk et al. | 701/1 |
| 6,842,774 B1 | * | 1/2005 | Piccioni | 709/207 |
| 2002/0035605 A1 | * | 3/2002 | McDowell et al. | 709/206 |
| 2002/0038386 A1 | * | 3/2002 | Bhatia et al. | 709/200 |
| 2002/0095486 A1 | * | 7/2002 | Bahl | 709/223 |
| 2002/0128908 A1 | * | 9/2002 | Levin et al. | 705/14 |

(Continued)

*Primary Examiner*—David Wiley
*Assistant Examiner*—Phuoc H. Nguyen
(74) *Attorney, Agent, or Firm*—Townsend and Townsend and Crew LLP

(57) ABSTRACT

A system and method provide for establishment and use of permission sets for subscribers where client applications in a wireless communication environment are requesting location information for a particular wireless communications device from a provider of such information. The system described herein provides the capability for a wireless communications device operator to establish a profile wherein limitations may be placed on the provision of such location information based on such things as the requesting party, spatial and temporal limitations, as well as granularity. The system described herein may be further configured such that an authentication process is preformed for client application seeking location information which would require the registration of such client applications with a centralized processing system.

32 Claims, 7 Drawing Sheets

U.S. PATENT DOCUMENTS

Figure 1:
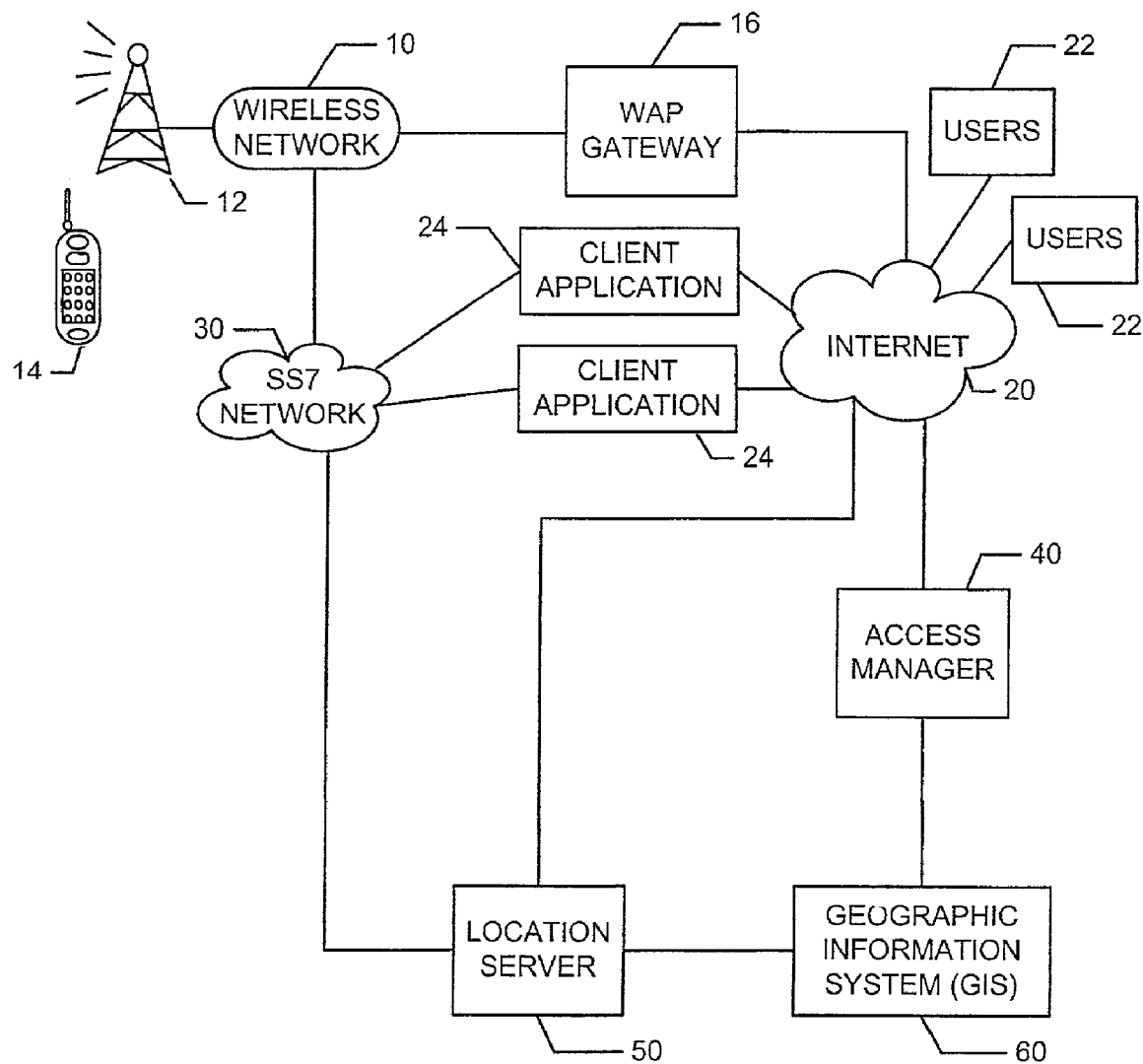

| | | |
|---|---|---|
| 2003/0063072 A1* | 4/2003 | Brandenberg et al. ...... 345/173 |
| 2003/0065441 A1* | 4/2003 | Funk ........................ 701/207 |
| 2003/0084033 A1* | 5/2003 | Hays et al. .................... 707/3 |
| 2003/0113116 A1* | 6/2003 | Roman ........................ 398/65 |
| 2003/0130893 A1* | 7/2003 | Farmer ........................ 705/14 |
| 2003/0163684 A1* | 8/2003 | Fransdonk ................. 713/153 |
| 2004/0170154 A1* | 9/2004 | Carter et al. ................. 370/338 |
| 2004/0198221 A1* | 10/2004 | Bin et al. .................. 455/41.1 |
| 2005/0043060 A1* | 2/2005 | Brandenberg et al. ...... 455/558 |
| 2005/0044423 A1* | 2/2005 | Mellmer et al. ............ 713/201 |
| 2005/0064851 A1* | 3/2005 | Malackowski et al. .. 455/414.1 |
| 2005/0094604 A1* | 5/2005 | Ozluturk .................... 370/335 |

* cited by examiner

SUBSCRIBER PROFILE

| | |
|---|---|
| 302 — CUSTOMER ID | |
| 304 — OP ID | |
| 306 — USER NAME | |
| 308 — USER ALIAS | |
| 310 — PASSWORD | |
| 312 — STATUS | |
| 314 — LANGUAGE PREFERENCE | |
| 316 — MIN/MSISDN | |
| 318 — PSID | |
| 320 — GLOBAL PRIVACY FLAG | |
| 322 — PROVISION NOTIFICATION OPTIONS | |
| 324 — PERMISSION SETS | COMPANY A<br>COMPANY B<br>COMPANY C |

FIG. 3

| | |
|---|---|
| 402 — CLIENT ID | |
| 404 — APPLICATION ID | |
| 406 — APPLICATION PASSWORD | |
| 408 — APPLICATION NAME | |
| 410 — APPLICATION TYPE | |
| 412 — APPLICATION DESCRIPTION | |
| 414 — STATUS | |
| 416 — USER ID | |
| 418 — REQUESTRATE THRESH | |
| 420 — ALLOWED REQUEST TYPES | |
| 422 — ALLOWED ACCURACY | |
| 424 — HIGHEST ALLOWED PRIORITY | |
| 426 — PRIVACY OVERRIDE | |
| 428 — COORD PREFERENCE | |
| 430 — CACHE OPTIONS | |
| 432 — LOCATION NOTIFICATION | |
| 434 — PROVISION NOTIFICATION | |

FIG. 4

METHOD AND SYSTEM FOR MANAGING LOCATION INFORMATION FOR WIRELESS COMMUNICATIONS DEVICES

RELATED APPLICATIONS

This application claims priority under 35 U.S.C. §119 to prior U.S. Provisional Patent Application Ser. No. 60/269,506 filed Feb. 16, 2001, the entirety of which is hereby incorporated by reference.

FIELD OF THE INVENTION

The present invention relates to a system and method for managing distribution of location information generated for wireless communications devices, and more particularly to providing a control system configurable to limit access to a subscriber's wireless device based on subscriber privacy preferences.

BACKGROUND OF THE INVENTION

In recent times the use of wireless communications devices has grown dramatically. In many countries throughout the world sophisticated wireless communications networks have been built so that wireless communications are possible from almost any geographic location. Devices employable in these networks may include wireless telephones and pagers, as well as specially configured palm top computers and PDA's. Types of communication possible by these devices may include the exchange of audio and textual information as well as the establishment of connections over the Internet. As the use of wireless communications devices has grown, so have the number of services related to the provision of wireless communications.

One such service which is available and is associated with the use of wireless communications devices, is the provision of location based services which focus on the issue of providing value-added services to subscribers based on the geographic location of a wireless device within a wireless network. In one form of the service, subscribers may be able to access information about businesses which are in close geographical proximity to their wireless communications device. As the subscriber to the services moves about within different locations in the wireless network, additional queries may be made as to businesses located in their vicinity.

As a modification of the above-described location services, businesses or other organizations may wish to track the location of a wireless device on a periodic basis and then use this information in any number of different ways. For example, a business selling services may provide different information as to the locations of their establishments based on where the subscriber is located. Further, businesses which deal in the fast efficient delivery of services may wish to track their employees through monitoring the location of wireless communication devices.

SUMMARY OF THE INVENTION

The inventors have recognized that certain privacy issues may exist with regards to the provision of location information of wireless communications devices to requesting client applications. Specifically, a wireless device user may wish to limit access to their location information according to any number of privacy preferences, such as the time of day of the request, their current location at the time the request is made, the accuracy of the provided information and/or the party who is seeking such information. As such, the inventors have further recognized that providing an interface system between the party seeking the location information and the system which collects and stores the location information provides to the wireless communication device user the ability to control the access which the third parties may have to their location information.

Described herein is a system and method for controlling access to location information which has been generated by a system which monitors and stores location information gathered for subscriber wireless communications devices. Included in the system is a memory which is configurable to store records (profiles) for each wireless communications device for which location information is being gathered. At a minimum, each profile may include identification information for the device, a description of at least one client application to which location information may be provided when requested, and privacy preferences which controls the manner in which location information is provided to the client application.

Also included in the system may be one or more interfaces through which external parties may gain access. The interfaces are configured at a minimum to process requests for location information from a client application. As part of the request processing, the interface is configured to access the memory and retrieve a profile for the wireless communications device for which the location information is requested. Based on whether the requesting client application is listed in the profile, the location information may then be provided in a manner defined by the privacy preferences established for the particular client application. Privacy preferences includable in a particular profile for a subscriber may comprise total denial of access, limited access during a specified time period, limited access to a particular type of entity making the request, access only granted to request of a particular granularity, and access only granted when the wireless communications device is within a particular geographic region.

The interface may be further configured such that subscribers may access the system described herein over a data network, such as the Internet, and access their own subscriber profile. Through a variety of interactive displays, the subscriber may change listing of authorized client application, privacy preferences, as well as access information to the profile (i.e., passwords). The interfaces provided for this access may be in HTML format for access with an Internet web browser or wireless application protocol (WAP) when employing an Internet enabled wireless communications device.

The interface described above may be further configured to perform authorization and authentication processes for client applications which periodically request location information for one or more wireless communications devices. Profiles for authorized client applications are created and stored in memory and may be accessible by a client application in a manner similar to what was described above with regards to subscribers accessing their own profiles. Included in the client application profile may be such items as client identification and access information (e.g. ID's and password) location request processing for information such as the client application such as location request types, time periods when the location request are limited, limits on frequency on the location request, granularity for the location information provided, notification provisions for alerting a wireless communications device when a request for location information is made. When a client application accesses the system described herein identification information is first provided and compared against the information in the client application profile. If the information matches, additional function may then be performed.

Further included in the system described herein may be another interface specially configured for communicating with a location server device. The location server is configured to perform the function of collecting location information generated for one or more wireless communication devices and providing this information to the system described herein. The system may be configured to keep a cache of location information for particular wireless communications devices over a predetermined period of time. The system described herein may also be configured such that it is resident on the same computing platform as the location server.

The system described herein may be further configured such that other ancillary functions are performed with regards to the provisions of location information to requesting client applications. These functions may include automated billing for each instance where location information is provided. This may be performed through a data network connection with a remote billing function. The system may be further configured such that requests for location information are processed on a priority basis, that is, client applications with the highest priority have their request filled first. This may be especially advantageous with regards to providing information to emergency services which may request location information for a particular wireless communications device.

In operation, a client application will submit a request over a data network to the system requesting location information for an identified wireless communications device. Included in the request will be identification information for the particular wireless communications device. This information may be in the form of Mobile Station ISDN Number/Mobile Identification Number (MSISDN/MIN), permanent identifier (PSID), and time/session limited identifier (SSID). As was described above, each subscriber has a profile stored in memory which includes corresponding identification information for the wireless communications device, a listing of client applications authorized to receive location information, as well as privacy preferences employable in providing location information to the requesting client application. Once the profile is retrieved from memory an analysis is performed as to whether the client application may receive location information, and if so, in what form. After this analysis is complete, the location information is retrieved, either from a remotely located location server or a data cache and provided to the requesting client application.

When a request for location information is made by a client application, before steps are performed in providing location information, the authentication and authorization process for most requests is performed. As was mentioned above, client applications which employ the system described herein each have a client application profile which is stored in memory. When a client application accesses the system described herein, the information in the client profile is compared against information provided by the client application, and if the information matches, the location request is processed according to controls and preferences included in both the client and subscriber profiles.

In yet another step, both the client and subscribers may access the system described herein, to view and modify their respective profiles. Upon detected access by either type of party and then through appropriate selection made at the login screen, interactive screen displays are presented through which the particular party may view and/or amend their profile information. Once an indication is provided that the session is completed, the changes entered are saved as part of the particular profile. The system herein is configured such that the operation described herein may be performed over the data network using a commercial web browser or through a WAP enable wireless communications device connecting through a WAP gateway.

BRIEF DESCRIPTIONS OF THE DRAWINGS

FIG. 1 discloses a communications architecture within which the access system described herein operates.

Figure 2:
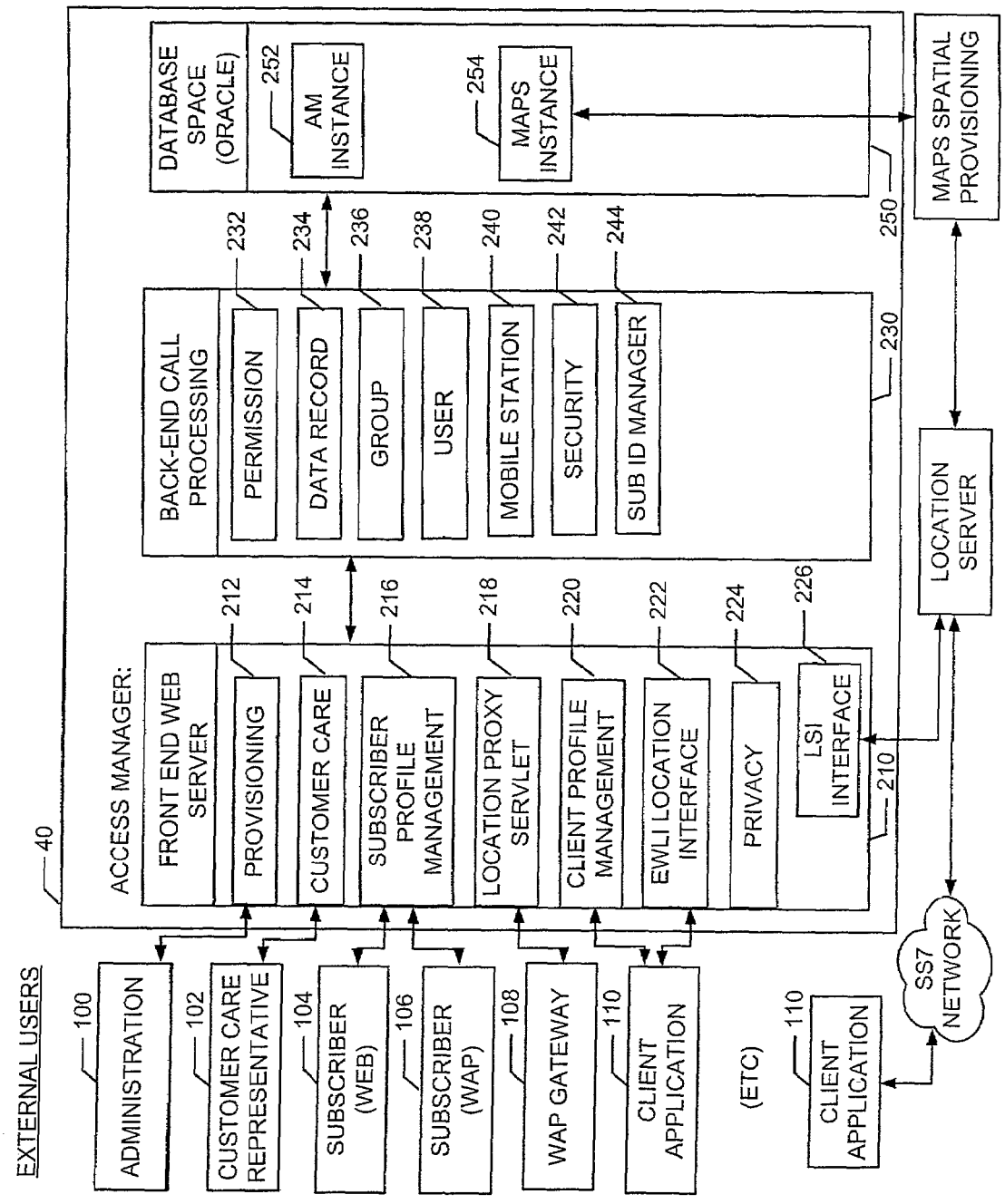

FIG. 2 discloses an operational architecture for the access server.

FIG. 3 discloses an example profile for a subscriber.

FIG. 4 discloses an example profile for a client application.

Figure 5:
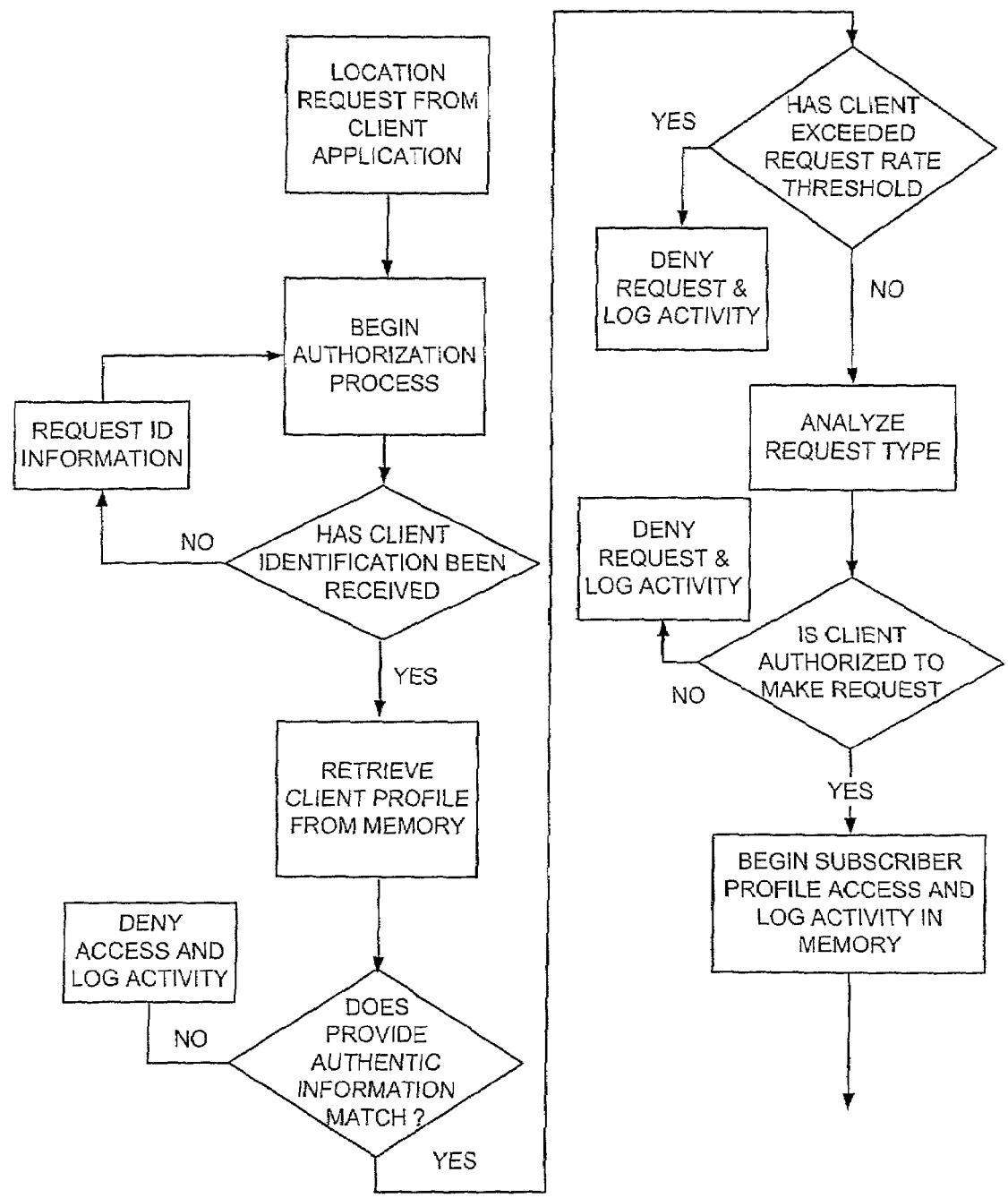

FIG. 5 discloses a flow chart which describes the steps performed in the authentication process for client applications.

Figure 6A:
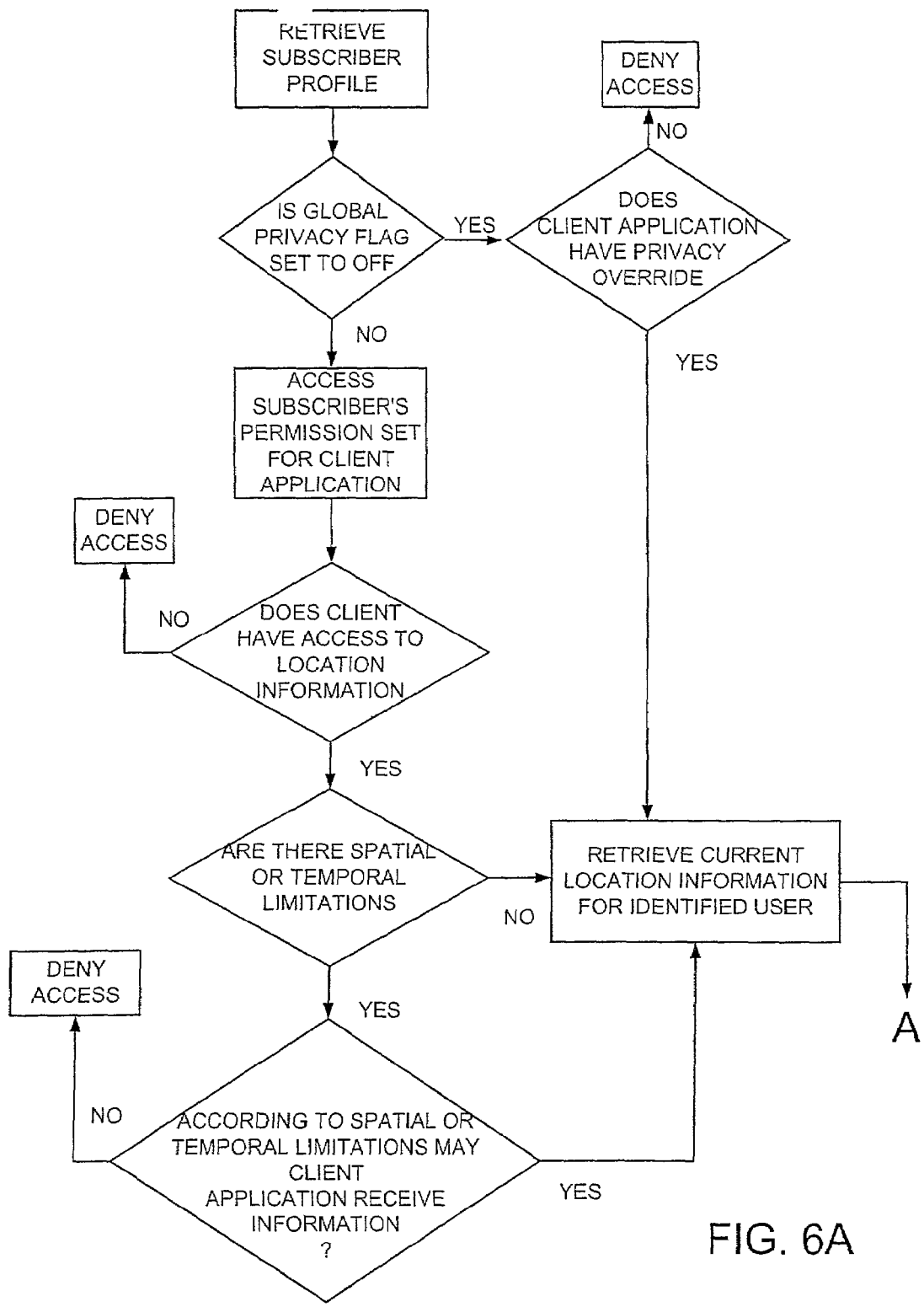
Figure 6B:
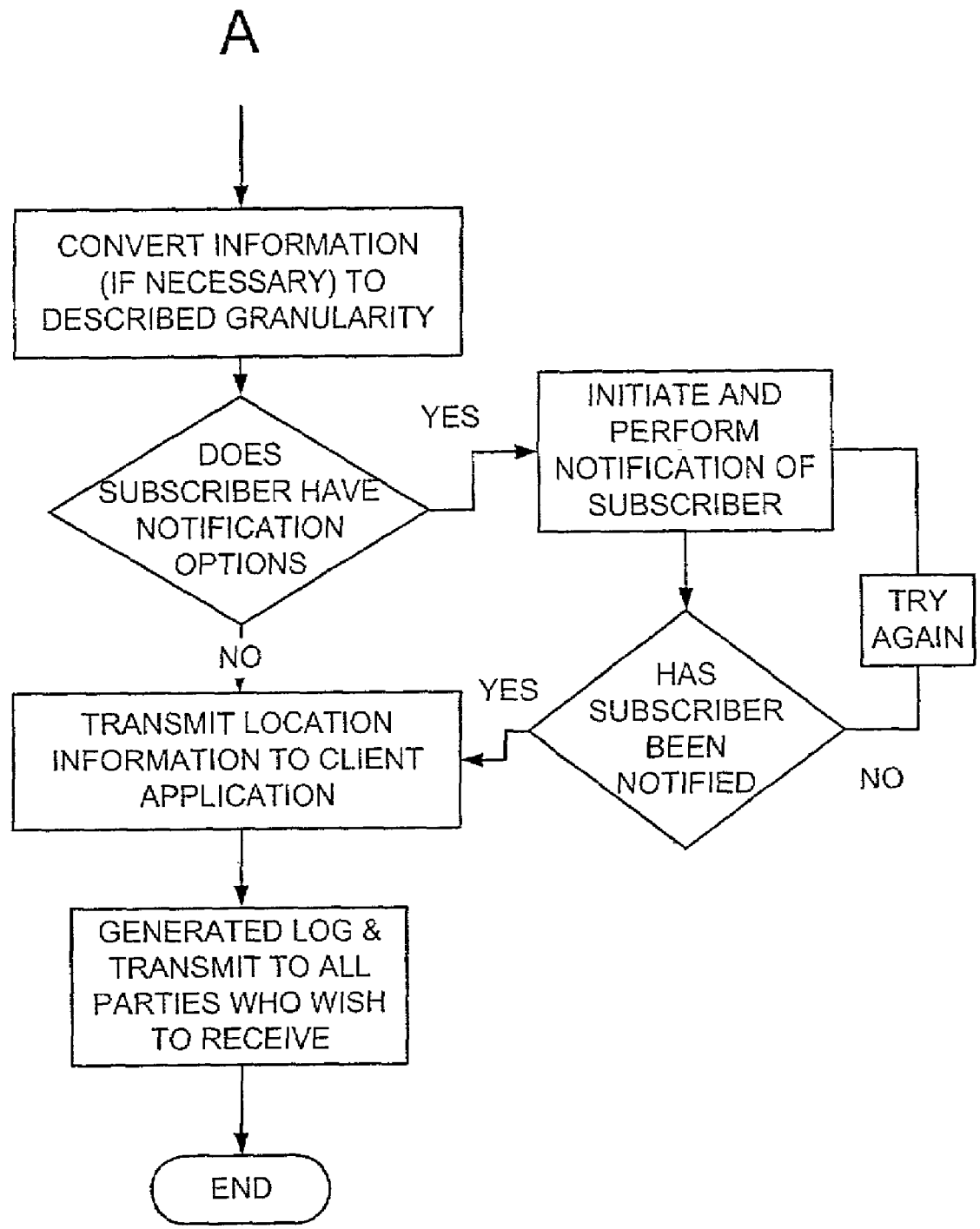

FIGS. 6A and 6B disclose a flow chart which describes the steps performed in performing access management of the location information for a wireless communications device.

DETAILED DESCRIPTION

Disclosed in FIG. 1 is an overall system architecture within which a wireless communications device and the system described herein operate. Shown in particular is wireless communications device 14 which communicates via wireless tower 12 over the wireless network 10. The wireless communications device 14 may comprise any number of known wireless communications devices such as a wireless telephone including 3G phones with direct HTML interfaces, a pager, and/or a PDA which was either designed for wireless communications or later configured to perform these functions. The wireless communications devices may be further configured for short message service (SMS). The wireless communications network 10 is in communication with the SS7 network 30 which in turn is part of the public switch telephone network (PSTN).

As is known, wireless communications devices may be configured to include web-browsers which allow for navigating over the Internet. In order to provide for this type of communication, the wireless communications device is configured to employ protocols such as the wireless application protocol (WAP). The wireless network 10 may provide a connection to the Internet 20 through a WAP gateway 16 in order to provide for these types of communications.

Continuing on with FIG. 1, in connection with the Internet 20 and the SS7 network 30, is location server 50. The location server 50 is a platform for collecting location data and location primitives for designated wireless communications devices and then providing this information to requesting applications. In one configuration of the invention, the location server periodically receives location requests and in turn requests the location information from one or more types of location finding equipment (LFE) as to the current location of a wireless communications device and then stores the location information in memory. In another configuration of the invention, the location server actively initiates contact with one or more types of LFE to obtain the location of a subscriber's wireless device. An LFE may employ different location finding technologies, e.g., GPS, AOA, TDOA, and Cell sector technologies. The stored location information may preferably include at least location information and corresponding time information for particular wireless communications devices, and may further include location uncertainty information, travel speed information, and travel direction information.

In response to a location request from an external application, the location server may retrieve location information from memory or, alternatively, one or more of the LFE's may be prompted to obtain location information. In this regard, the location request may include a specification regarding the desired location information, for example, how recent or how accurate the information should be. If the memory includes information conforming to the specification, then this information is retrieved and output to a requesting application. Otherwise, appropriate information may be obtained by prompting one or more LFE's to locate the wireless communications device of interest.

According to the system described herein, requests for location information request are typically made through access server 40, but requests from trusted applications may be made through the SS7 network 30 directly to location server 50. Mapping data used in conjunction with providing visual presentation of location is received from a geographic information system (GIS) 60. A more detailed discussion of the operation of the access server 40 is provided below.

The access server 40 may comprise a number of components networked across the data network, a separate server, and/or a system configured on the same platform as the location server 50. In one configuration, the access server may be configured on one or more Application Servers such as BEA System's WebLogic product., although one skilled in the art would realize that any number of commercially available computing platforms may be employed. The access server is configured such that it may establish communications through any numbers of interfaces. According to the system described herein, most requests for location information for wireless communications devices are received at the access server either over the telephony network or over the Internet. In response to the requests, the access server is configured to perform a number of different functions. These functions include authentication of client applications requesting location information, privacy screening for subscribers when supplying location information to authenticated client applications, providing access for subscribers and client applications so that they may control their own profiles, and various other interfaces for administrative functions such as billing for location services.

Disclosed in FIG. 2 is a system architecture 200 for the access server which includes the various processing submodules employed. Also shown are the external entities which regularly communicate with the access server. Establishing a connection with these entities may be performed in any number of ways. Connections may be established either over the public switch telephone network (PSTN) or over the Internet. In the case where a wireless communications device is employed to establish a connection, a WAP gateway from the PSTN to the Internet may be employed.

The access server in one configuration of the invention may be partitioned in to three separate areas. A first portion of the access server includes a front end web server 210 which may comprise servlet space. The front end web server 210 includes a number of processing modules which act as interfaces for the various entities (i.e., client applications, subscribers, customer care representatives, administrators, etc.) who access the server. The back end call processing 230 is configured to include programming objects, rules, and listings in memory which are employable by the various interface functions resident in the front end web service 210.

The back end call processing may be configured in Enterprise Java Bean (EJB) space. The database space is configured to store instances employed in conjunction with the operation of the access server and the GIS. The database space 250 may be resident in one location or it may be distributed across one or more networks. Portions of the database space 250 may also be associated with other systems to which the system 200 may have access.

Included in the servlet space 210 is provisioning module 212 which is accessible by administrative function 100 and is configurable to perform various low level functions with regards to configuring the system for operation. Further included in the access server is a customer care module 214 through which customer care representatives 102 may access the system. Functions to be performed through this interface may include the creation modification, or deletion of subscriber and client application profiles. The configuration of both the client and subscriber profiles will be described in greater detail below.

The subscriber profile management module 216 is an interface which allows subscribers to access their profiles which have been established for the provision of location services. As will be described in greater detailed below, a profile includes descriptive information for each subscriber as well as a number of different privacy preferences establishable by the subscriber in order to control the provision of a subscriber's location information to requesting client applications. Subscribers profiles are accessible by a subscriber through any number means which include: over the Internet through use of a local web browser, or the use of an enabled wireless communication device employing a network interface protocol such as WAP. As part of the subscriber profile management 216, various interactive screen displays may be presented (in formats such as HTML for Internet access and WAP for wireless device access) through which a subscriber may perform various functions with regards to managing their profile.

Further included in the front end web server 210 is location proxy servlet 218. As was mentioned above, Internet enabled wireless communications devices may connect to the Internet through WAP gateway 108. In one configuration of the invention, a number of location sensitive URL's may be stored in the WAP gateway 108 which will cause a redirection of the WAP session to the location proxy servlet 218. After suitable authorization, (of either the subscriber or client application) the inquiry received from the gateway will be further processed to obtain a location of the subscriber.

The location may be returned to the original origin server as a name/value pair. The location proxy 218 may support three methods of subscriber identification: 1) anonymous-no identifiers provided (WAP sessions state must be maintain independent of proxy) 2) ESID-an external identifier obtained from the WAP gateway (or WAP session) is past along with location and is used to maintain session state/context, and 3) SSID-a session identifier is created and delivered with location to the origin server. The location proxy does not assign new identifiers to subscribers ID's. It accepts the MSISDN, optional application ID, transaction ID and date range to filter the location against.

A function of the WAP location proxy is to service anonymous location distribution to clients for which there is no direct association (permission) between the subscriber and client (typically a content service). In this case, no identifier is included with the response and the client application makes no additional request directly to the access server though a location transaction interface. The client profile will determine what type of identifier is required. The client profile may have a component which is specific to the WAP location proxy. A session ID may be used to allow the origin server to make subsequent requests directly through the interface, or to preauthorize location requests from a specific client for the duration of the session.

It is possible that a request received from the WAP gateway may not contain the necessary parameters defined as mandatory for the location transaction interface. In that case, a single set of defaults will apply and will be compared against parameters in the client profile for all WAP location requests. These defaults will be stored in template-driven default profile for location proxy client, and would be configured through the administration functions.

In conjunction with providing access for subscribers to manage their profiles, the same functionality is provided for client applications through client profile management module 218. Access to this module may be gained over the Internet. Once access is attained, various interactive screen displays may be presented wherein a client application may access and modify their own profile. Access to the profile may be controlled through an authorization and authentication process.

An external wireless location interface (EWLI) 222 is also accessible by client applications 110 over either the Internet or the SS7 network. The EWLI 222 may be described as XML/HTTP based interface with DTDs adapted to a proprietary or industry standard format. This module is configured to provide a transaction interface which enables processing of location requests from external client applications. Before processing the location request, the EWLI 222 performs an authorization and authentication test to determine if the requesting client application is authorized to request such location information. Various procedures performed during the authentication authorization include checking identification information and passwords provided against the information in the client profile, making a determination that the request rate has not been exceeded, and that the client application is still classified as active.

In providing location information for a particular wireless communications device the EWLI 222 works in conjunction with, the privacy module 224 which is configured to access the subscriber profile stored in memory and perform an analysis of whether and to what degree, location information may be provided to the requesting client application. If the necessary criteria are met, the privacy module signals to the EWLI 222 that the location information may be provided and the EWLI then acts to retrieve this information either from a local cache or from the location server.

The location server interface 226 is configured to provide for communications with location server 50. In many situations, trusted client application may directly establish a connection with the location server over the SS7 network or other protocol. In such cases privacy functions may still need to be performed and the location service interface 226 is configured to provide a connection from the location server to the privacy module 224. Once the privacy preferences are identified, the location server may then provide the location information in the desired manner.

Interconnected with the front end web server 210 is the back end call processing 230 which may be resident on the same server or otherwise distributed across a network. Included in this portion of the server are a number of objects which are employable by one or more of the interfaces in the front end web server. The back end call processing 230 is further in communication with the database space 250 which may be implemented using compatible database software such as Oracle. Stored in the database space 250 which are instances 252 employable by the access server 252 and maps instances 254 employed by GIS 60. Stored in particular in the instances 252 are the profile information for the subscribers and client applications.

Returning to the back end call processing 230, included therein is the permission sub-module 232 which includes the permission objects employable by the EWLI 222 when interpreting the permission preferences for the subscribers. The data record processing module 234 acts as a data cache which is employable to store a running record of location information points for a particular subscribers over a particular period of time. In order to avoid making a request of the location server every time a request is received by a client application, this information may be continually provided by the location server and the data record processing module acts to store a number of location points for each subscriber. Some information requested by client applications may be provided from this data module, however, in certain situations request may be made directly of the location server.

The group object 236 provides a grouping of the client applications according to similar privacy preferences designated by subscribers. Many times the same privacy preferences may apply to a group of client applications (for example, all Microsoft client applications may have similar privacy preferences) such that it simplifies the processing of location request to group these client applications together. The user object 238 includes a listing of subscribers employing the access service described herein. Profiles for each of the users may be retrieved from the instances 252 in the database space.

The mobile station object 240 is a listing of identification codes for each subscribers wireless communications device. The identification codes are resolved in MSISDN and/or MIN.

The security object 242, in conjunction with the permissions object 232, performs the analysis with regards to whether a permission applies to a received location request. When the privacy preferences of a subscriber profile are being analyzed, the security object 242 will access the permission relationships the permission object 232 in order to perform this analysis. Finally the sub ID manager 244 tracks the sub ID's that are assigned to wireless communications devices when location information is provided. In one or more countries, it may be illegal to provide both the telephone number and location information for a particular wireless communications device. As such, sub ID's are assigned to these devices and this number is use to identify the device when a request for location information is made. The sub ID manager 244 merely tracks the relationship between the actual phone number and the assigned sub ID.

Also in connection with the location server 50 and the access server 40 is the GIS 60. This system is configured to employ the location information and stored map information in order to provide a visual display of a wireless communications device location. Some client application or subscribers may have the option of viewing the location information in this format.

As was mentioned above, stored in memory are profiles for both the client applications and subscribers. Disclosed in FIG. 3 is an example of a profile for a subscriber which, as mentioned above, identifies the subscriber's wireless communications devices and includes a listing of privacy preferences for client applications which have been authorized to receive location information. In particular, the profile includes a customer Id 302 which is a unique customer identifier for subscribers with one or more MIN/MSISDNSs. The operator Id 304 is a numeric identifier (typically 10 digits) used to identify the operator (both service provider and network operator) for which the subscriber is associated with.

The user name 306 is a name established by the subscriber and is used when logging into the system. The user may also employ an alias 308 which is used for subscriber personalization during web, WAP, or SMS interaction. A subscriber profile password 310 may be set by the subscriber, in order to limit access to the profile.

Other items which may be included in the modifiable subscriber profile are the status 312 which indicates whether the subscriber is active or inactive. The language preference 314 indicates the language of choice of the subscriber and may be indicated by a three character code. The MIN/MSISDN 316 is an identification number for the wireless communications device or SIM card in such device. The PSID 318, a permanent identifier, is not easily derivable from MIN/MSISDN 316, that may be used to identify subscriber by specified clients during position requests. The global privacy flag 320 when set to "off" blocks all location request, except for privacy override. If "on" is indicated in this box, the permissions described below will define the privacy.

One option provided by the system described herein is for a subscriber to receive a notification on their wireless communications device whenever a location request is made by any client application. In the provision notification option 322, the subscriber may enter a particular selection for notification. The options may include: employ the application profile option for the requesting client applications, no notification, notify every time but no response required, notify every time, response required (for example through an SMS flash or web notification).

The final entry in the subscriber profile 300 is the permission sets 324 for client applications which will make requests. An entry is included in this part of the profile for each authorized client. Permission sets for each authorized client may include a temporal permission set which identifies the time of day/day of week a particular authorized client may access the location information. The spatial permission set provides a listing of the enabled geographic areas (for example city/county/state), for providing the location information. The granularity filter indicates for a particular client application the allowed accuracy of the location information which is to be delivered. The allowed accuracy may be employable for selecting a particular location technology (i.e., AGPS vs. cell/sector). The subscriber may also indicate in this permission set the type of notification to be received when a location request is made.

Disclosed in FIG. 4 is a client application profile 400 which includes information employed during the authorization and authentication process for client application which a client application may access and modify. The client ID 402 is a unique identifier for a business provider of one or more applications and the application ID 404 is a unique number identifier for each of the client's applications authorized to receive location information. Each client who employs the system described herein may employ multiple applications each of which may request location information. The client ID and the application ID may be employed in conjunction with the application password 406 when a client application logs into the system. The application name 408 may be a character chain used in notification messages and service provisioning selection. The application type 410 may be an integer value employed by the operator to classify applications into sub-groups. Further, an application description 412 may be a character description of the application used for subscription pages to describe the application for subscribers.

The status 414 may indicate whether the particular application is active or inactive. Only active applications may be allowed to make request of the access server. The user identification 416 portion the client application profiles indicates in what manner a subscriber will be identified when the client application makes a location request. Options include: MIN/MSISDN, PSID and SSID.

The request rate threshold 418 provides a limitation of the maximum number of requests per unit time (request throttling) that the particular client application may make. The allowed request type 420 provides an indication of the types of request allowed for this particular client. A Boolean flag may indicate whether the request is allowed or disallowed. The allowed accuracy 422 provides an indication in horizontal and/or vertical measurements of the accuracy of the provided location information.

The highest allowed priority 424 indicates the highest priority level allowed for this particular client and a default which is used for requests. The privacy override permitted 426 either allows a privacy override (typically set for emergency client applications) or does not allow it. The coordinate preference 428 merely indicates the form in which the particular client application which is to receive the location information. For example, choices may include WGS84, Gauss/Kruger, lambert, UK ordinance, Dutch RD, and Swiss Grid.

The cache option 430 provides an indication of the maximum age of the location information stored in cache which may be provided to the client application. The location notification options 432 may be selected to identify the type of notification a subscriber may receive when a client application makes a location request. The options may include using the subscribers profile settings, no notification, notify subscriber, no response required, and notify subscriber, response required. Finally the provision notification option 434 provides an indication of the type of notification which will be generated when the client application signs up to receive location information for a particular subscriber. The options may include no notification, notify subscriber, no response required, and notify subscriber, response required.

As was described above, the profiles 300 and 400 are accessible by the subscriber and client applications, respectively, over the telephony network or Internet. When an Internet ready wireless communication device is employed, a WAP gateway may be accessed to facilitate the connection. The profiles may be presentable on an interactive HTML (or WAP) based screen display through which the accessing party may modify certain, parameters. Allowed values for each parameter may be selectable from drop/down boxes wherever possible to minimize manual entry errors and default parameters will be assigned to all fields not populated. In addition to the subscriber and client application profile described above, a set of administrative functions may also be included in the access server to configure and maintain various operational parameters within the system which includes: client/subscriber profile template default, subscriber identifiers, the ability to add/modify/delete client applications from the system, and client type definitions.

In typical operation for the system, client applications will periodically make request to access and retrieve the current location of a particular wireless communications device. Requests are typically received through the EWLI location interface. According to the invention described herein, the client application may comprise any number of services provided by registered organizations. One service in particular may include emergency services which may be trying to respond to an emergency call received from the wireless communications device. If the location information may be easily located and retrieved, emergency services may be more quickly dispatched. In this situation, high priorities may be given to emergency services which circumvent the entire privacy profile and immediately provides the information.

Other client applications may be service or goods providers whose business is geographically oriented. For example, if a wireless communications device is in the area of a particular hotel, restaurant, and/or store, the business may want to know that, so relevant advertising may be transmitted to the wireless communications device. In another example, the client application may be a business which wishes to periodically track the locations of their employees.

As was described above, one of the first steps performed when a client application is making a location information request, is the authentication and authorization of that particular client application. Disclosed in FIG. 5 is a flow chart which describes in detail the steps performed when authenticating and authorizing a client application. Initially, the client application will access the system either through the EWLI location interface 222 or directly though the location server via the SS7 network, wherein the LS interface 226 will receive the communication. Once the location request is received from the client application, the authentication and authorization process will begin. As an initial step, a query may be made as to whether the client identification number and password have been received. When received, the system will search for the corresponding client application profile in memory.

Once the client application profile is retrieved from memory, a comparison is made between identification information included in the profile and that provided by the client application. If the information does not match, a "denied access" message will be presented to the requesting application. If the proper identification and password information is provided, before any of the subscriber information is identified and retrieved, a query will be made as to whether the particular client has exceeded a request rate threshold. This procedure may be performed by accessing the data log in memory to identify previous requests. If the request rate threshold has been exceeded, the system will deny the request and log the activity.

If the request rate threshold has not been exceeded, a further analysis is made as to whether the type of request being made by the client application is allowed according to the client application's own profile. If the request type is disallowed, the request is denied and the activity is logged in memory. If the client is authorized to make a request, this also noted in memory and the process is begun to retrieve and provide access to location information for the identified wireless communications device.

Disclosed in FIGS. 6A and 6B is a flow chart which describes in detail the steps performed in order to control access to the location information for an identified wireless communications device according to a subscriber's privacy profile. As a first step, using the identification information for the device provided by the requesting party (client application), a search is performed of the database to identify and retrieve the appropriate subscriber profile. The identification information for the subscriber may be received by the system in at least two ways. The first way is as a result of the authentication authorization process described in detail in FIG. 5. The other way is through the location server 50 which may be contacted directly by trusted applications (for example emergency services). In this situation, the location server is configured to establish contact with the privacy module 224 which in turn retrieves the subscriber's profile and provides location information according to the profile.

The first query made once the subscriber profile is retrieved, is to whether the global privacy flag is set to "off". A subscriber has the option of completely turning off the privacy profile such that any queries for their location information are denied. The only situation where the location information will be retrieved in this situation is if the client application has a privacy override. If a client does not have the privacy override and the global privacy setting is set to "off", the request will be denied.

If the global privacy flag is not set to "off", the subscriber permission set is then accessed within the profile. In most situations, the subscriber has indicated which client applications may receive location information. Each client application listed may further include one or more limitations as to the manner in which the location information will be provided. If the particular client application is not included in the privacy profile, the request for location information is denied. The subscriber may have the option of configuring their privacy profile such that any and all parties who request the information may be provided the data. However, in most cases it is assumed that the subscriber has specifically indicated that the client application is to receive location information.

If the client application does have access to the location information, the location information is retrieved from a data cache or from the location server. At this point, an analysis is made as to whether, based on the preferences included in the profile, the particular client application may receive the location information. As was mentioned above, each profile includes a permission set for each client application which further specifies a temporal permission set (time of day/day of week), a spatial permission set (enable geographic area-city/country), a granularity filter (allowed accuracy to deliver) as well as a location notification option for notifying the subscriber when a location request is made. Before the location information is provided, a determination is made as to whether, for that client application, there are spatial or temporal limitations. The current spatial and temporal characteristics for the location of the identified wireless communications device are then analyzed and compared against the retrieved permission set. Based on this comparison, a determination is then made as to whether the location information may be provided to the requesting party based on the established permission set.

For example, if the permission set for a particular client application is established such that location information will only be provided when the particular wireless communications device is in Colorado, and the access server detects that the wireless communication device is in New York City, the request for information will be denied. Either in conjunction with or separately, if temporal limitations are put on the provision of the location information, and if the request for location information is made outside of a specified time period, the request for location information will also be denied. The system described herein is configured to account for the movement of the communications device within different time zones.

Once it is determined that the client application may receive the location information, the granularity permission is analyzed to determined the form in which the information should be provided. If there is no limitation provided then the most specific form of information is provided, otherwise based on the permission set, the information is converted to the noted granularity. A last query is then made to determine whether the subscriber has selected any notification options for being notified when a client application is making a location information request. If there is a notification option chosen, this notification is provided in conjunction with the transmission of the location information to the client application. Also in conjunction with the transmission of the location information, a data log may be updated and various other administrative tasks performed, such as billing, which relates to the provision of the location information to the client application.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A system for controlling access to location information generated for wireless communications devices, comprising:
   a first memory configured for storing at least one privacy profile for at least one subscriber wireless communications device, wherein the privacy profile includes:
      identification information for the at least one wireless communications device,
      a list of client applications that are permitted to receive the location information for the at least one wireless communications device, and
      a permission set for each of the client applications in the list of client applications, wherein the permission set comprises at least one of a temporal limitation on access to the location information or a spatial limitation on access to the location information; and
   a first interface accessible over a data network which is configured to access, retrieve and provide the location information for the at least one wireless communications device to the client application wherein prior to provision of the location information the first interface is further configured to access the privacy profile of the at least one wireless communications device in the first memory and, based on an analysis of the list of client applications that are permitted to receive the location information, provide the location information in a manner specified in the profile, which includes but is not limited to denying access to the location information.

2. The system of claim 1 wherein the first interface is further configurable to provide access to the subscriber profile for the at least one wireless communications device and to enable a subscriber accessing the profile to modify at least one of: the identification information, at least one privacy profile, and access information to the at least one privacy profile.

3. The system of claim 2 wherein the permission set for each of the client applications includes at least one of: total denial of access, access limited to a time period, access limited to a type of entity making the request, access only granted to request of particular granularity, and access based on user's geographic location.

4. The system of claim 1 wherein the first interface is further configured to perform an authorization and authentication process for requesting client applications which request the location information for the at least one wireless communications device.

5. The system of claim 4 wherein the memory is further configured to include a client profile for each of the requesting client applications wherein the client profile includes at least one of: client identification information and location request processing information.

6. The system of claim 5 wherein the client profile may further include at least one of: allowed location request types, time periods when the location requests are limited, limits on frequency of the location requests, granularity allowed of the location information provided, notification provisions for the at least one wireless communications device.

7. The system of claim 4 wherein the first interface is further configured to provide access to the client profile and enable the requesting client applications to modify the client profiles that they are authorized to access.

8. The system of claim 1 wherein further including a second interface through which communications are established with a location server which provides the location information for the at least one wireless communications device.

9. The system of claim 7 wherein the second interface is configured to receive location requests made through the location server, and to access the subscriber profile and provide access to the location information for the at least one wireless communications device based on analysis of the privacy preferences in the subscriber profile.

10. The system of claim 1 wherein the first interface is configured to communicate over the data network with at least one of: a computer workstation configured with a web browser and a network connection, wireless communications device employing wireless access protocol (WAP) and connecting through a WAP gateway, a wireless communications device configured for short message service (SMS) and a phone configured with a direct HTML browser.

11. The system of claim 1 wherein the first interface is further configured to perform at least one of: automated billing functions related to the requests for the location information received from the requesting applications; provide the location information based on a priority assigned to the client application; and request throttling which controls number of the location requests the client applications are permitted to make within an identified time period.

12. The system of claim 8 wherein at least one of: the first memory and the first interface, are configurable on the same platform as the location server.

13. A method of controlling access to location information generated for wireless communications devices operating in a wireless communications network, comprising:
   receiving a request associated with at least one wireless communications device over a data network from a requesting client application;

accessing a subscriber profile associated with the at least one wireless communications device in memory, wherein the subscriber profile includes:
  a list of authorized client applications; and
  a permission set for each of the authorized client applications, wherein the permission set includes at least one of a spatial limitation on access to the location information or a temporal limitation on access to the location information;
determining whether the requesting client application is an authorized client application;
determining whether the request is in accordance with the permission set for the authorized client application; and
if the requesting client application is an authorized client application and the request is in accordance with the permission set for the authorized client application, providing access to the location information for the at least one wireless communications device.

14. The method of claim 13 further comprising authenticating and authorizing the requesting client application upon receipt of the request for the location information for the at least one wireless communications device.

15. The method of claim 14 wherein authenticating and authorizing comprises:
  accessing a client profile in memory associated with the requesting client application;
  receiving identification information from the requesting client application;
  comparing the received identification information with identification information stored in the client profile; and
  authenticating and authorizing the request for the location information if the received identification information substantially matches the stored identification information.

16. The method of claim 13 wherein the permission set further includes at least one of: total denial of access, limited access to a time period, access limited to a type of entity making the request, access only granted to request of particular granularity, and access based on user's geographic location.

17. The method of claim 15 wherein the client profile further includes at least one of: allowed location request types, time periods when the location requests are limited, limits on frequency of the location requests, granularity allowed of the location information provided, notification provisions for the at least one wireless communications device.

18. The method of claim 15 further comprising:
  detecting an access request for the client application profile for the requesting client application, wherein the request includes identification information for the requesting client application;
  retrieving the client application profile from memory and presenting said profile to the requesting client application; and
  detecting modifications to the client application profile and entering the detected modifications in the client application profile.

19. The method of claim 14 further comprising:
  detecting an access request for the client application profile for the at least one subscriber, wherein the request includes identification information for the at least one subscriber;
  retrieving the subscriber profile from memory and presenting said profile to the requesting subscriber; and
  detecting modifications to the subscriber profile and entering the detected modifications in the subscriber profile.

20. The method of claim 13 further comprising processing the location requests received from client applications over a data network and directly from a location server.

21. The method of claim 13 wherein communications are processed by web browsers or wireless communications devices through a WAP gateway.

22. The method of claim 13 further comprising the step of initiating an automatic billing procedure upon a detected connection by the at least one client application.

23. The method of claim 13 further comprising the step of providing request throttling for the location requests.

24. The method of claim 13 further comprising the step of processing the location requests according to a priority assigned to the requesting client application and included in the client application profile.

25. A method of controlling access to location information for wireless communications devices operating in a wireless communications network, the method comprising:
  receiving a request from a client application for location information for a wireless device;
  retrieving a subscriber profile from a memory, the subscriber profile including a list of authorized client applications and a permission set for each of the authorized client applications, wherein the permission set includes at least one of a spatial limitation on access to the location information or a temporal limitation on access to the location information;
  querying the subscribe profile to determine whether the client application is an authorized client application;
  querying the subscriber profile to determine whether the permission set for the client application authorizes the client application to receive the location information for the wireless device;
  determining that the client application is either not an authorized client application or not authorized to receive the location information; and
  denying the client application access to the location information.

26. The method of claim 25 further comprising:
  notifying the wireless device that the client application is not authorized to receive the location information; and
  updating the subscriber profile to authorize the client application to receive the location information during subsequent requests.

27. The method of claim 26 wherein updating the subscriber profile is performed by a subscriber.

28. The method of claim 26 wherein updating the subscriber profile comprises updating the permission set for the client application.

29. The method of claim 28 wherein the permission set comprises at least one of a temporal permission set, a spatial permission set, a granularity filter, or a notification instruction.

30. An apparatus for receiving a request for location information for a wireless device from a plurality of client applications and controlling access to the location information, the apparatus comprising:
  a first memory adapted to store a subscriber profile for the wireless device, wherein the subscriber profile includes identification information for the wireless device, a list of authorized client applications, and a permission set for each of the authorized client applications, the permission set including at least one of a spatial limitation on access to the location information or a temporal limitation on access to the location information;

a first interface accessible over a data network, the first interface adapted to:
receive a request for location information from at least one of the plurality of client applications;
access the subscriber profile;
determine whether the at least one of the plurality of client applications is an authorized client application;
determine whether the at least one of the plurality of client applications has permission to receive the location information; and
provide the location information to the at least one of the plurality of client applications if the at least one of the plurality of client applications is an authorized client application and has permission to receive the location information.

31. The apparatus of claim 30 wherein the temporal permission set defines a time of day in which the authorized client application is allowed access to the location information.

32. The apparatus of claim 30 wherein the permission set includes at least one of a granularity filter or a notification instruction.

* * * * *